June 21, 1960 F. D. HAZEN 2,942,091
METHOD OF AND APPARATUS FOR WELDING METAL TUBES
Filed May 26, 1958 3 Sheets-Sheet 3
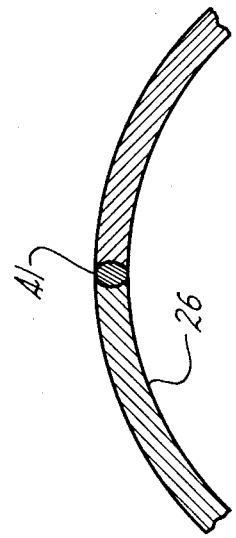
Fig. 12.
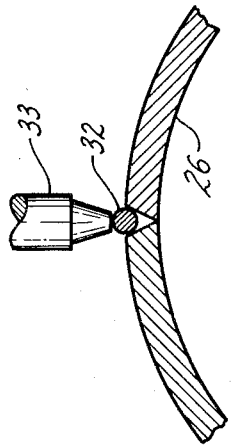
Fig. 11.
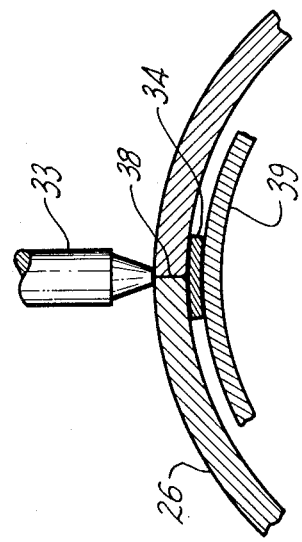
Fig. 13.
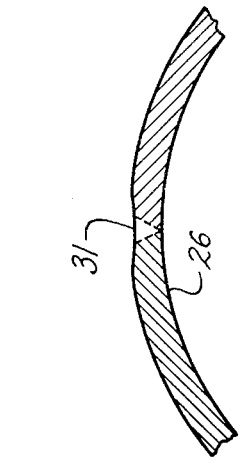
Fig. 10.
Fig. 9.
INVENTOR.
Frank D. Hazen
BY William B Jaspert
Attorney.

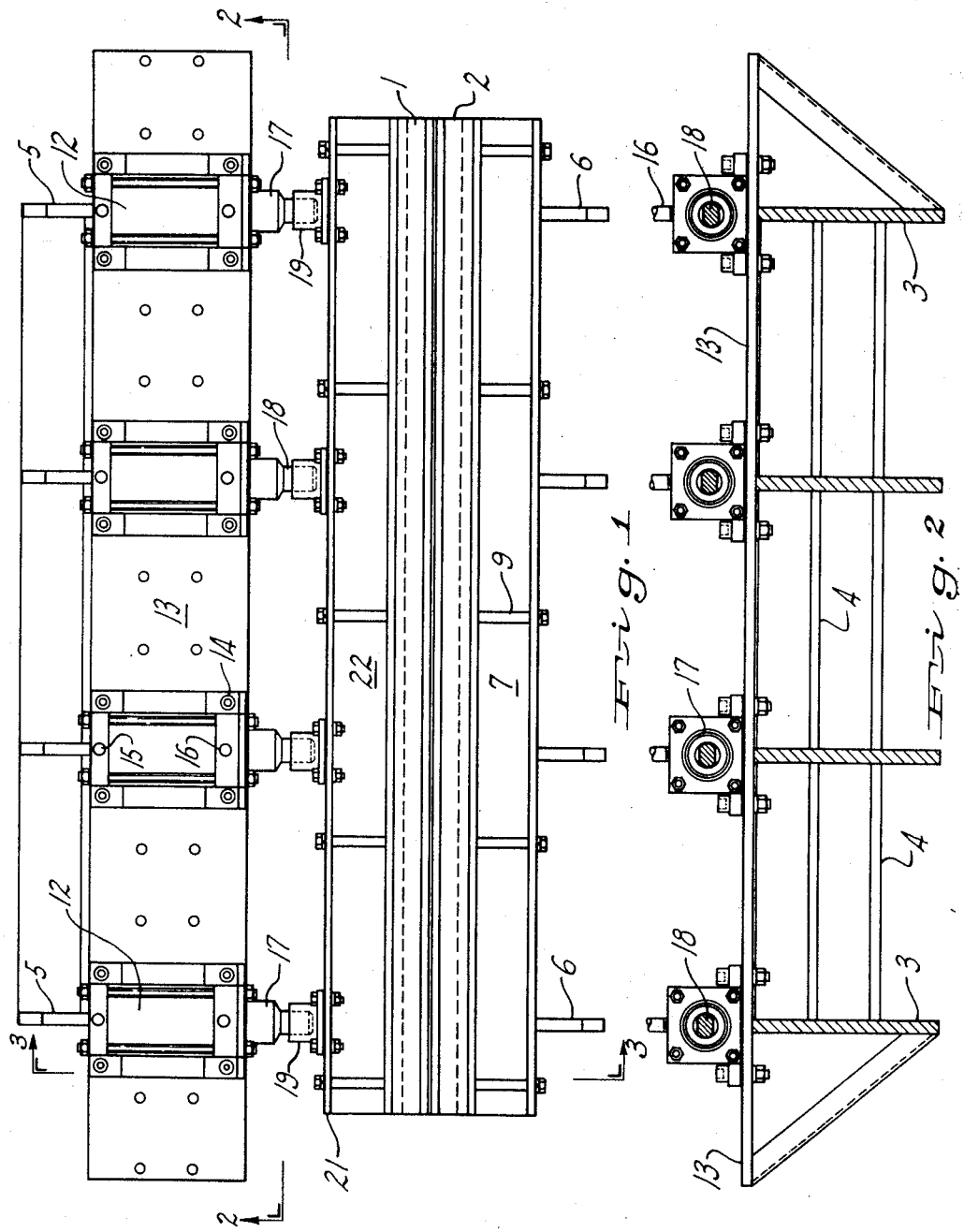

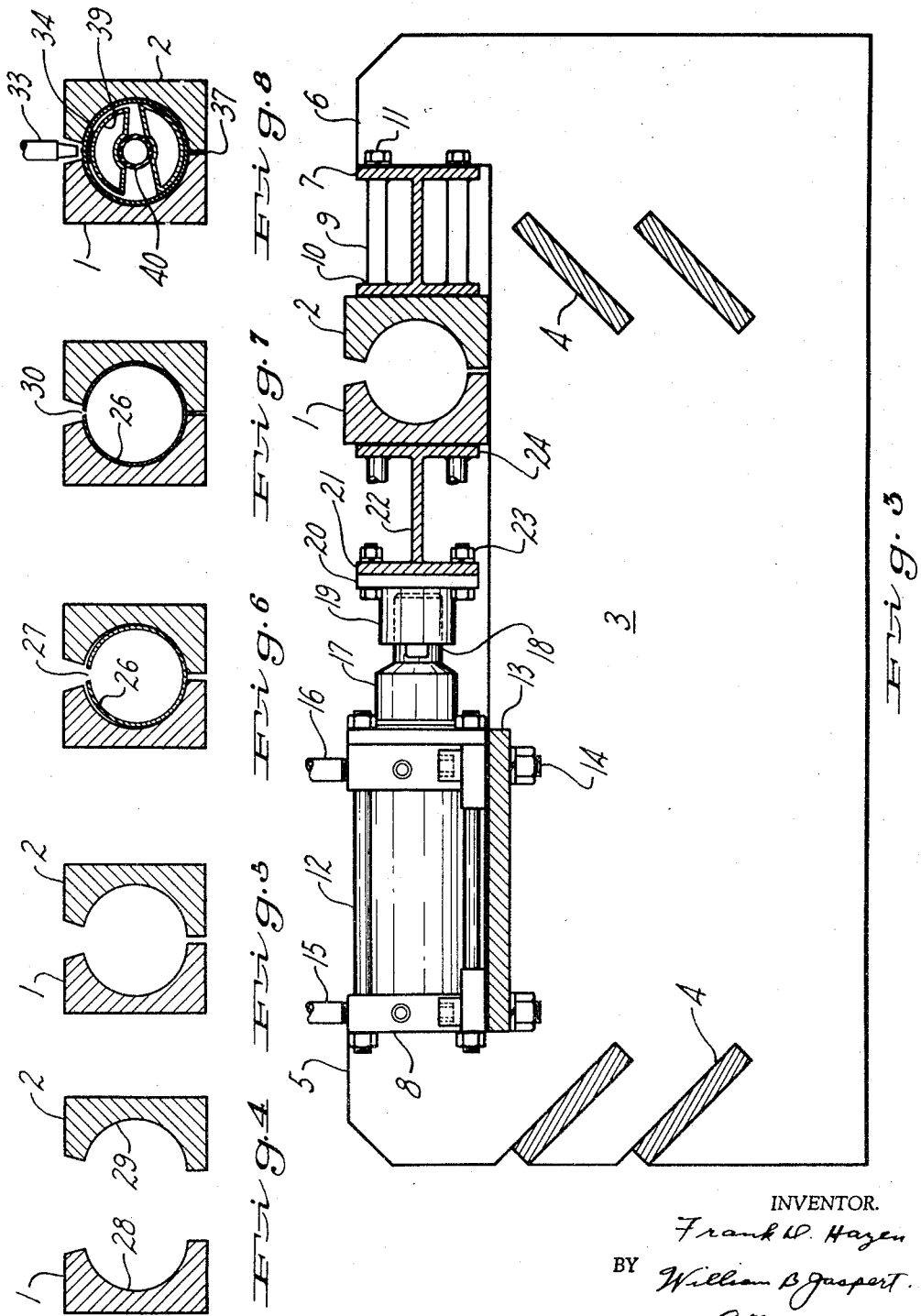

United States Patent Office 2,942,091
Patented June 21, 1960

2,942,091
METHOD OF AND APPARATUS FOR WELDING METAL TUBES

Frank D. Hazen, P.O. Box 10597, Pittsburgh 35, Pa.

Filed May 26, 1958, Ser. No. 737,824

3 Claims. (Cl. 219—67)

This invention relates to new and useful improvements in apparatus for and method of arc welding metal tubes and the present invention is a continuation-in-part of my earlier application serially numbered 660,573 filed May 21, 1957.

It is among the objects of this invention to provide a combination forming die and holding jig operated by enormous hydraulic pressure for shaping and sizing a preformed tube and holding the same while it is welded with the forming pressure acting on the fused metal at the joined surfaces to assure a sound unbreakable weld.

It is a further object of the invention to provide a method of welding tubing from sheet metal or skelp of substantial wall thickness without distorting or misshaping the cross-sectional area of the metal at the weld or seam.

It is a further object of the invention to provide a combined die shaping and jig holding device which is particularly adapted for shaping and welding stainless steel tubes of substantial length in which the forming and holding pressure is applied along the entire length of the tube and maintained until the fused metal is set to prevent separation along the seam.

It is a further and a primary object of the invention to provide a method of shaping and holding metal tubing during the welding thereof by employing extremely high pressure which is applied and maintained during and after the welding of the joined edges of the tubing until the metal is set to prevent introduction of stresses that would cause distortion of the shape of the tube and would cause the seams to be sprung.

The invention will become more apparent from a consideration of the accompanying drawings constituting a part hereof in which like reference characters designate like parts and in which:

Figure 1 is a top plan view of a portion of a tube forming and welding machine embodying the principles of this invention;

Figure 2 is an elevational view, partially in section, taken along the line 2—2 of Figure 1;

Figure 3 is a view, partially in section, and partially in elevation, taken along the line 3—3, Figure 1;

Figure 4 is a cross-sectional view of a combination die and jig holder in its wide open position;

Figure 5, a similar view thereof in closed position;

Figure 6 is a view of the die and jig member with the preformed split tubing inserted therein;

Figure 7, a similar view showing the die action in forming or shaping the tube;

Figure 8, a cross-section of the forming die and jig with an electrode in position for welding;

Figure 9 is a cross-sectional view of a portion of the tube wall at the welded seam with a portion of the wall melted down;

Figure 10, a similar view with the electrode and a filler in position for welding;

Figure 11, a view of the finished weld of Figure 10;

Figure 12, a cross-sectional view of a portion of the weld with filler material added; and, Figure 13 is a cross-sectional view of a section of the tube with the electrode holder.

The invention is especially useful in the manufacture of stainless steel tubes for metal recuperator structures, these tubes varying in size from about five to six inches or more in diameter and up to ten feet or more in length, the size and length, however, not in any manner restricting the use of the invention, which may be adapted to any size tube. Also the guage of the metal employed may vary up to a thickness of ¼ of an inch and for this reason the forming and shaping die is powered to develop pressures up to 60 tons per square inch of contact surface area, this being more clearly explained in connection with a description of the drawings. The blanks or skelp from which the tubing is made are sheared on a press to exact dimension from flat sheets of stainless steel or other metal. The sheared sheet or skelp is then preformed between convex and concave dies to form a round in the shape of a tube with an open seam and the preformed tubular member is then inserted between a pair of movable shaping dies for carrying out the final steps in the method of making recuperator tubes.

In Figure 3 of the drawings, the numerals 1 and 2 represent a pair of dies for forming or shaping the tube and also function as a jig for holding the tubes for arc welding.

The numeral 3 designates a machine base with reinforcing bars 4, the base 3 having end portions 5 and 6 against which an I-beam 7 and a cylinder end bracket 8 are mounted. The member 7 has pipe members 9 welded on the flanges of the I-beam, as shown, and bolts 11 extend through the pipe members 9 into threaded portions of the die member 2. On the other end of the machine frame a cylinder 12 is secured to an offset plate 13 by bolts 14, the cylinder being connected by pipes 15 and 16 to a source of hydraulic pressure. A piston 17 disposed in cylinder 12 has a cylindrical head 18 loosely fitted in a cup 19 having flanges 20 for clamping to a flange 21 of an I-beam 22, the flanges 20 and 21 being fastened by bolts 23. The forming die element 1 is secured to the I-beam flange 24 by bolts in the same manner as the die element 2 is secured to the I-beam 7.

The piston head 18 loosely fits into the socket 19 so that the parts are self-aligning and no binding takes place. In this manner the die forming element 1 is free to align itself with the die forming element 2 when the tube material is disposed therebetween and where, as shown in Figures 1 and 2, a plurality of cylinders and piston elements like that shown in Figure 3, are connected to the die forming member 1, the self-aligning feature assures the development of uniform pressure on the face of the die element along the entire length of the welded seam.

There are four hydraulic pistons and cylinders connected to the I-beam 22 in Figures 1 and 2. The cylinders are eight inches in diameter and have an area of substantially fifty square inches to which is applied 2000 pounds hydraulic pressure per square inch, making a total of 100,000 pounds pressure per cylinder or a total pressure of 400,000 acting on the pistons of the four cylinders. This amounts to 200 tons which is available on the forming face of the die element 1. If, therefore, a stainless steel preformed tube a quarter inch thick, 10′ long is placed between the die elements 1 and 2, a total pressure of 6.6 tons per square inch is available on the contacting edges of the tubing.

The effect of this high pressure will be readily understood in connection with the description of Figures 4 through 13 of the drawing which show, in Figure 4, that the die elements 1 and 2 may be separated a substantial distance to permit sliding in the preformed tubing 26, Figure 6, the ends of which are spaced apart, as shown at 27, Figure 6. The forming faces 28 and 29 of the shaping dies 1 and 2 are machined or ground to the exact outer dimension of the tubing to be formed. When the preformed tubing or skelp 26 is placed between the dies 1 and 2, as shown in Figure 6, pressure from cylinders 12 is applied to the full length of the die 1 causing the dies to move against the tubing 26 to bring the ends in abutting relation, as shown in Figure 7.

If the tubing is closed to the degree shown in Figure 7, the top edges of the open V seam 30 would burn away resulting in a welded tube of a reduced cross-sectional area, as shown at 31, Figure 9. This is known as a falling, or sunken, seam. To compensate for the depression along the weld on the outside of the tube at the seam, a filler rod 32 could be laid in the V in the manner shown in Figure 10 and when the parts are welded by the arc generated between the electrodes 33 and 34 of Figure 8, a hump 35 would be formed in the V-joint. The section of the tube would not be of uniform thickness at a point adjacent the hump 35, as shown by the indentation 36 in Figure 11.

To avoid mis-shaping of the tube at the seam or welded joint, the high pressure available for shaping the preformed tube, as described above, is applied to compress the tube body to the point where the die members 1 and 2 are almost touching at the base, as shown at 37, Figure 8. In this position the entire hydraulic pressure of the movable die 1 is exerted to bring the edges of the preformed tube in substantial abutting relation, as shown at 38, Figure 13.

As shown in Figure 8, the bottom electrode 34 is mounted on a semi-circular holder 39, of which there are two separated by an inflatable member such as a rubber hose 40, to bring the electrode 34 in contact with the metal tube underneath the electrode 33, which is more clearly shown in Figure 13 of the drawings. With the edge faces of the preformed tube making full contact, as shown in Figures 8 and 13, the seam of the tube will be welded without any change in the cross-sectional dimension of the shell or wall of the tubing at the joint or seam. This is because the forming pressure on the dies 1 and 2 is acting on the tube wall at the time the metal is fused by the welding arc developed by the electrodes 33 and 34. The pressure is maintained on the welded joint until the latter has cooled and the metal is set. This prevents introduction of stresses which would cause deformation of the finished tube to a so-called banana shape. The enormous pressure of the cylinders is uniformly applied to the tube before, during and after welding and held or maintained until the welded section of the tube is set.

Without the uniform distribution of the high forming and holding pressure on the dies 1 and 2 and maintaining said pressure after the seam weld has been completed until it has cooled, the tube would spring open at the seams at the ends and intermediate places and would, by the introduction of stresses, cause the finished tube to warp out of shape.

It is evident from the above description of the invention that the use of high pressures of the order herein disclosed brings the face edges of the preformed tubes in abutting contact and die forms the tubes to exact dimension to which it is held during the welding of the seam and the application and maintenance of the high pressure joins the fused metal into an inseparable weld when cooled under pressure.

The invention is of special merit when used for forming and welding stainless steel tubes for recuperators used with industrial heating furnaces because such tubes are exposed to the high temperatures of the products of combustion of such furnaces, and any weakness in the tubes caused by faulty forming and welding steps would result in failure.

Although one embodiment of the invention has been herein illustrated and described, it will be evident to those skilled in the art that various modifications may be made in the details of construction without departing from the principles herein set forth.

I claim:

1. A method of making seamless tubing of sheet metal by arc welding which comprises subjecting a preformed tube blank with an open seam to an externally applied shaping and sizing pressure with the edges of the blank abutting to form the seam, the pressure being uniformly distributed over the entire area of the metal and the full length of the abutting edges of the seam and being of a magnitude to pre-stress the metal to a degree in excess of any stresses imposed by the heat of the weld and maintaining the shaping pressure during and after the application of the welding arc until the weld is cooled.

2. In a machine for welding tubing from a tube blank with an open seam, a pair of semi-cylindrical relatively movable shaping jaws of the shape of the tube to be welded and of the finished size of the outer diameter thereof, said jaws extending the full length of the tube, one of the shaping jaws being attached to a fixed bar extending the full length of the jaws and the other of said shaping jaws being attached to a similar but movable bar having cup-shaped socket elements axially spaced along said bar and a plurality of hydraulic cylinders having pistons extending into said socket elements to subject the same to the pressure of said pistons, the socket elements being self-aligning with said pistons to distribute the pressure uniformly along the full length of the bar and thereby along the full length of the shaping jaw that is attached to said bar.

3. In a machine for welding tubing from a tube blank with an open seam, a pair of semi-cylindrical relatively movable shaping jaws of the shape of the tube to be welded and of the finished size of the outer diameter thereof, said jaws extending the full length of the tube, one of the shaping jaws being supported on a structural shape extending the full length of the jaw and held against movement in a frame and the other of said shaping jaws being mounted on a movable bar of structural shape having socket portions spaced at intervals axially of said bar and hydraulic cylinders with piston elements engaging said socket portions to be self-aligning therewith to thereby apply uniform pressure through said supporting bar against the movable shaping jaw the full length of said jaw.

References Cited in the file of this patent

UNITED STATES PATENTS

| | | |
|---|---|---|
| 989,497 | Frick | Apr. 1, 1911 |
| 1,135,539 | Mack | Apr. 13, 1915 |
| 1,810,112 | Riemenschneider | June 16, 1931 |
| 1,872,055 | Andren et al. | Aug. 16, 1932 |
| 2,066,025 | Zublin et al. | Dec. 29, 1936 |
| 2,605,732 | Anderson | Aug. 5, 1952 |